Patented Jan. 14, 1941

2,228,657

UNITED STATES PATENT OFFICE 2,228,657

ARTIFICIAL DISPERSIONS OF RUBBER

Roswell H. Ewart, Naugatuck, Conn., assignor, by mesne assignments, to Dispersions Process, Inc., New York, N. Y., a corporation of Delaware No Drawing. Application January 13, 1938, Serial No. 184,771

5 Claims. (Cl. 260—760)

This invention relates to the manufacture of artificial dispersions of rubber, the products of such manufacture, and mixtures of latex with such dispersions.

Artificial dispersions of reclaimed and crude rubbers are commonly made by milling the rubber into a plasticized condition and transferring the plasticized stock to an internal mixer, such as a Werner & Pfleiderer mixer, and adding a hydrophilic colloid to the mass and water until an inversion of phase takes place and the rubber ceases to be the continuous phase and becomes dispersed in the aqueous medium. Three types of hydrophilic colloids are commonly used today to make such dispersions, namely, colloidal clays, casein, which may be solubilized, and soaps. It is desired oftentimes to mix such artificial dispersions of rubber with natural dispersions of rubber, i. e. latex, and in so doing there often develops undue thickening of the mixture. Colloidal clay and casein are highly water absorbent and the colloidal clay or the casein in clay dispersions or casein dispersions of rubber tends to dehydrate the natural rubber particles of latex when mixed with the dispersion, and thicken and destabilize and sometimes coagulate the mixture. Artificial soap dispersions of rubber where the soap forming acid has been saponified by alkali hydroxides, as is common practice, show an exceedingly high viscosity, especially at solids concentrations around 50%, even where the minimum amount of soap has been used to produce a stable dispersion, and the soap is of a type that possesses a relatively low degree of hydrolysis in aqueous solution. Such high viscosity soap dispersions only with difficulty mix with latex without undesirable thickening and sometimes coagulation.

The present invention relates to the production of artificial dispersions of rubber which may readily be mixed with latex, even at solids concentrations of the dispersion and of the latex of 50% and above, to give stable mixtures. The invention further contemplates the production of a new type of artificial dispersion of rubber which has a low viscosity even at concentrations of 50%, and which is free from the disadvantages of aqueous dispersions of rubber dispersed on such strongly water-absorbing materials as colloidal clays and casein.

According to the present invention, rubber is dispersed in water in the usual way by means of a soap, the acid radical of which is saponified by means of an alkali silicate instead of an alkali hydroxide as in the prior practice of making aqueous dispersions of rubber on soaps. Such aqueous dispersions of rubber where the rubber particles are dispersed in the aqueous medium with the aid of an alkali silicate-saponified soap maintain a low viscosity, even at concentrations of rubber up to 50%, and can be readily mixed with normal or concentrated latices to give stable fluid mixtures. Various alkali silicates, for example, sodium meta silicate ($Na_2O.SiO_2$), sodium ortho silicate ($2Na_2O.SiO_2$), and ordinary water glass ($Na_2O.4SiO_2$) may be used. In fact, alkali silicates (as defined below) where the ratio of the alkali content to the $SiO_2$ content is between that of silicates having the composition $2R_2O.SiO_2$ and $R_2O.4SiO_2$, where R is an alkali metal, may be used as the saponifying agent for the soap in producing the dispersions of the present invention. It may be seen that alkali hydroxide added to a given alkali silicate will be the equivalent of a different silicate having a higher ratio of alkali content to $SiO_2$, and the utilization of such mixtures of alkali silicates and alkali hydroxides in saponifying the soap-forming acid radical may therefore be considered to be merely the use of an alkali silicate with a higher ratio of alkali content to $SiO_2$. The expression "alkali silicate" is intended to include such mixtures of preformed alkali silicates and free alkali. By "alkali content" is meant the calculated alkali hydroxide that can be titrated with a strong mineral acid, such as sulfuric acid. The alkali content of a stable dispersion where the rubber is dispersed on an alkali silicate-saponified soap need not be equivalent to more than two parts by weight of sodium hydroxide per 100 parts of rubber.

Various soap-forming acids, such as oleic acid, stearic acid, palmitic acid, abietic acid and rosin may be saponified with alkali silicates to form the soap. If desired, the amount of soap-forming acid may be in excess of that which would be saponified by the alkali silicate present, in which case the excess that is not saponified may become dispersed with the rubber and acts as a compounding ingredient in the dispersion. In the examples below, however, the soap-forming materials were saponified with an excess of alkali silicate, or alkali hydroxide, as the case may be.

The invention is primarily adapted to the manufacture of artificial dispersions having a solids content of at least 50% so that these may be readily mixed with commercial latices which have been concentrated by mechanical or chemical creaming to give mixtures having a high rubber content. The process of the present invention may be used, however, to produce dispersions, and mixtures of latex with such dispersions, of any desired solids content. If it is desired to form mixtures of latex and such artificial dispersions having rubber contents comparable with those of normal latex, for example, then the dispersions may be made with a rubber content as low as 30% and these may be mixed with normal latex, or with concentrated latex which has been diluted, to maintain the rubber concentration in the mixture approximately that of normal latex.

A comparison of the viscosities of dispersions of various solids content where the rubber was dispersed on sodium hydroxide-saponified soap and the equivalent amount of two different sodium-silicate saponified soaps is made in Table A. The dispersions shown in this table and in Table B were made from a black tube reclaim which contained 4% of soap forming materials, calculated as rosin, from the reclaiming operation. In preparing the dispersions of Table A and Table B, the reclaimed rubber was "broken down" or plasticized on a mill and placed in a Werner & Pfleiderer mixer where a small amount of water and the sodium silicate or sodium hydroxide was mixed into the rubber and more water added, a small amount at a time, until an inversion of phase took place and the rubber became dispersed in the aqueous medium. Further water was added until the desired solids concentration for the various examples was obtained. In the first example in Table A, the rosin in the reclaim was saponified by 1% by weight of the reclaim of sodium hydroxide. In the second example, the rosin was saponified by a commercial sodium silicate known as "U" brand sodium silicate which has an empirical formula approximately ($Na_2O.2.5SiO_2$). In the third example, the rosin was saponified by a commercial sodium silicate known as "Metso 99" sodium silicate which has an empirical formula approximately ($3Na_2O.2.1SiO_2$). In the second and third examples, an amount of the sodium silicate equivalent to the 1% sodium hydroxide of the first example was used, i. e. an amount of the sodium silicate was used which had a calculated sodium hydroxide content on titration with a strong acid equal to 1% of the weight of the reclaim.

Table A

|   |   | Viscosity (centipoises) | | |
|---|---|---|---|---|
|   |   | 30% solids content | 40% solids content | 50% solids content |
| I | Reclaim dispersed on 1% NaOH | 9.5 | 45 | 1,970 |
| II | Reclaim dispersed on "U" silicate | 5.3 | 10 | 62 |
| III | Reclaim dispersed on "Metso 99" silicate | 6.6 | 23 | 118 |

It may be seen from the above table that the viscosities of the sodium silicate-saponified soap dispersions are less than the viscosity of a sodium hydroxide-saponified soap dispersion, and this reduction in the viscosity is especially marked at higher solids content of the dispersions as shown by comparison of the viscosities at 50% solids content.

In Table B, the reclaim was dispersed on 2% sodium hydroxide and also on an equivalent amount of sodium silicate which in this case consisted of "U" brand sodium silicate equivalent to 1% sodium hydroxide together with 1% sodium hydroxide to increase the ratio of alkali content to $SiO_2$ content in the sodium silicate.

Table B

|   |   | Viscosity (centipoises) | | |
|---|---|---|---|---|
|   |   | 30% solids content | 40% solids content | 50% solids content |
| IV | Reclaim dispersed on 2% NaOH | 10.4 | 30 | 2,310 |
| V | Reclaim dispersed on 1% NaOH +"U" silicate | 5.8 | 22 | 126 |

Table B clearly shows that the lowering of the viscosities by saponification of the soap with alkali silicate instead of alkali hydroxide takes place even where 2% alkali hydroxide or its silicate equivalent is used. Further, this table shows that a mixture of sodium hydroxide and sodium silicate acts as a sodium silicate having a higher ratio of alkali content to $SiO_2$ content. This is even more astonishingly brought out by a comparison of Example I of Table A with Example V of Table B where the viscosity of a dispersion made on a soap produced by saponification of soap forming material with a mixture of 1% NaOH and an amount of sodium silicate ("U" brand) equivalent to 1% NaOH had a viscosity far less than a dispersion made on a soap produced by saponification of the same soap-forming material with 1% of NaOH alone, and in fact a viscosity more comparable to a dispersion made on a soap produced by saponification of the soap forming material with an amount of sodium silicate equivalent to 1% sodium hydroxide as shown in Examples II and III of Table A.

As is shown by Table C, the present invention is applicable to dispersions of crude rubber as well as reclaimed rubber, and also to rubber dispersed on different soaps than those used in the preparation of the dispersions in Tables A and B. In the examples in Table C, pale crepe rubber was dispersed on a soap formed by saponification of oleic acid by 1.5% of the weight of the pale crepe of sodium hydroxide in Example VI, and an equivalent amount of "U" brand sodium silicate in Example VII. In preparing the dispersions of Table C and Table D below, the pale crepe rubber was "broken down" on a mill and the mass transferred to a Werner and Pfleiderer mixer where the soap forming acid was mixed into the mass, followed by a small amount of water and the sodium silicate or sodium hydroxide. More water was then added, a small amount at a time, until an inversion of phase took place and the rubber became dispersed in the aqueous medium. Further water was added until the desired solids concentration for the various examples was obtained.

Table C

|   |   | Viscosity (centipoises) | | |
|---|---|---|---|---|
|   |   | 30% solids content | 40% solids content | 50% solids content |
| VI | Pale crepe dispersed on 10.5% oleic acid+1.5% NaOH | 10 | 46 | 90 |
| VII | Pale crepe dispersed on 10.5% oleic acid+"U" silicate | 8.8 | 10 | 50 |

The rosin and oleic acid used in the examples of Tables A, B and C when saponified form soaps having a relatively low degree of hydration. Stearic and palmitic acids on saponification form soaps having a relatively high degree of hydration and hence will produce dispersions of rubber of a higher viscosity when used as the dispersing agent for the rubber. As shown in Table D, a soap whose soap forming acid is saponified by an alkali silicate produces a dispersion of a lower viscosity than a soap whose soap forming acid is saponified by an alkali hydroxide in the case of soaps having a high degree of hydration, particularly in higher concentrations of the dispersion.

Table D

| | Viscosity (centipoises) 50% solids content |
|---|---|
| VIII Pale crepe dispersed on 15% stearic acid+2.1% NaOH | 2080 |
| IX Pale crepe dispersed on 15% stearic acid+/"U" silicate | 1600 |

All the silicate dispersions illustrated in the examples above could readily be mixed with latices of various concentrations to give stable mixtures. The silicate dispersions and such latices may be compounded as by the addition of vulcanizing and other compounding ingredients and the dried products made therefrom vulcanized in a known manner. The silicate dispersions, or mixtures of such dispersions with latex, may be applied to flat fabrics as a coating for waterproofing purposes, or may be coated onto the back of pile fabrics as a backing for non-slip purposes, or as a base in which the piles are embedded, or as an anchoring means for securing the piles to a fabric or other base.

The term "latex" in the description and claims is used to designate a natural dispersion of rubber which may or may not be compounded, or vulcanized to any desired degree, and which may be in a normal, diluted, concentrated or purified condition. The term "artificial dispersion of rubber" in the description and claims is used to designate artificially prepared dispersions of pre-coagulated crude rubber, reclaimed rubber, or rubber-like materials.

In view of the many changes and modifications that may be made without departing from the principles underlying the invention, reference should be made to the appended claims for an understanding of the scope of the invention.

Having thus described my invention, what I claim and desire to protect by Letters Patent is:

1. The process of preparing an artificial dispersion of rubber which comprises adding water to a plasticized rubber mass containing the saponaceous reaction product of a soap-forming acid and an alkali silicate until an inversion of phase takes place and the rubber becomes dispersed in the aqueous medium.

2. The process of preparing an artificial dispersion of rubber which comprises adding water in an internal mixer to a plasticized rubber mass containing the saponaceous reaction product of a soap-forming acid and an alkali silicate until an inversion of phase takes place and the rubber becomes dispersed in the aqueous medium.

3. The process of preparing an artificial dispersion of rubber which comprises adding water in an internal mixer to a plasticized rubber mass containing the saponaceous reaction product of a soap-forming acid and an amount of alkali silicate equivalent to not more than 2 parts by weight of sodium hydroxide per 100 parts of rubber until an inversion of phase takes place and the rubber becomes dispersed in the aqueous medium.

4. An artificial dispersion of rubber as prepared by the process of claim 1.

5. An artificial dispersion of rubber as prepared by the process of claim 1 and containing at least 50% solids.

ROSWELL H. EWART.